United States Patent [19]
Benner

[11] Patent Number: 6,030,063
[45] Date of Patent: Feb. 29, 2000

[54] SWITCHGEAR CABINET WITH FRAME

[75] Inventor: Rolf Benner, Herborn-Amdorf, Germany

[73] Assignee: Rittal-Werk Rudolf Loh GmbH & Co. KG, Herborn, Germany

[21] Appl. No.: 08/860,143

[22] PCT Filed: Nov. 2, 1995

[86] PCT No.: PCT/EP95/04286

§ 371 Date: Jun. 17, 1997

§ 102(e) Date: Jun. 17, 1997

[87] PCT Pub. No.: WO96/20582

PCT Pub. Date: Jul. 4, 1996

[30] Foreign Application Priority Data

Dec. 23, 1994 [DE] Germany .............................. 44 46 223

[51] Int. Cl.[7] .................................................. A47B 47/00
[52] U.S. Cl. ........................ 312/265.1; 211/26; 211/189; 403/218; 312/265.3
[58] Field of Search .............................. 312/265.1, 265.2, 312/265.3, 265.4, 263, 257.1; 211/26, 189; 52/264, 270, 27.5, 79.1; 403/217, 218, 219

[56] References Cited

U.S. PATENT DOCUMENTS

| | | | |
|---|---|---|---|
| 2,058,263 | 10/1936 | Rosendale | 312/265.4 |
| 3,919,603 | 11/1975 | Salvati et al. | 312/257.1 X |
| 5,250,752 | 10/1993 | Cutright | 312/265.4 X |
| 5,422,436 | 6/1995 | Zachrai . | |

FOREIGN PATENT DOCUMENTS

| | | |
|---|---|---|
| 0145916 | 6/1985 | European Pat. Off. . |
| 2365764 | 4/1978 | France . |
| 4207281 | 4/1993 | Germany . |
| 4207308 | 11/1995 | Germany . |
| 585973 | 11/1958 | Italy ........................................ 312/263 |
| 693059 | 10/1979 | U.S.S.R. ................................ 403/219 |
| 9307072 | 4/1993 | WIPO . |
| 9318246 | 9/1993 | WIPO . |

*Primary Examiner*—Janet M. Wilkens
*Attorney, Agent, or Firm*—Pauley Petersen Kinne & Fejer

[57] ABSTRACT

A switchgear cabinet with a frame having frame members and corner connectors, and an open base closable by one or more bottom plates. A simple mounting of the bottom plates is achieved because the frame members serving as lower depth struts are covered from below by essentially U-shaped cover elements that have lateral arms and are connected to the depth struts and/or the corner connectors. The depth struts are chamfered in a region of their outer edges and form a seat for the outer lateral arms of the cover elements. The inner lateral arms of the cover elements have bearing flanges for the bottom plates folded toward the facing depth strut. U-shaped clamping elements with clamping screws can be used to join the bottom plates to the bearing flanges of the inner lateral arms of the cover elements.

12 Claims, 3 Drawing Sheets

SWITCHGEAR CABINET WITH FRAME

BACKGROUND OF THE INVENTION

This invention relates to a switchgear cabinet with a rack assembled with frame legs and corner connectors, and an open bottom that can be closed by one or several sheet metal bottom pieces.

In a switchgear cabinet of this type the application of the sheet metal bottom pieces must also be performed so that when the switchgear cabinet is erected, they can be applied and again removed from its interior. Thus the outlay for fastening plays an essential role. With known switchgear cabinets this outlay is considerable in most cases.

SUMMARY OF THE INVENTION

It is one object of this invention to provide a switchgear cabinet of the type previously mentioned, wherein the attachment and the removal of sheet metal bottom pieces is possible with little outlay and in a simple manner from the interior of the switchgear cabinet.

In accordance with this invention such object is achieved with the frame legs used as lower depth struts which are covered from below by cover elements, which are essentially U-shaped and which have lateral legs. The cover elements are connected with the depth struts and/or the corner connectors. The depth struts are beveled in an area of their outer edges and form a receiver for the outer lateral legs of the cover elements. The inner lateral legs of the cover elements have support flanges for the sheet metal bottom pieces which face a direction toward the corresponding depth struts. The sheet metal bottom pieces can be connected with the support flanges of the inner lateral legs of the cover elements using U-shaped clamp elements with attachment screws.

The U-shaped cover elements are connected with the lower depth struts of the rack, wherein the outer lateral legs are inserted in receivers of the depth struts and, together with the lateral walls, complete the exterior contours of the switching cabinet. The inner lateral legs with the support flanges, together with the front and rear lower frame legs of the rack, delimit the opening in the bottom area of the switchgear cabinet, which can be easily closed off with one or several aligned sheet metal bottom pieces. The edge areas of the sheet metal bottom pieces are connected with the support flanges. This can be done in a simple manner by using clamping elements provided with attachment screws. In the process the clamping elements enclose the sides of the sheet metal bottom piece and of the support flange facing away from each other.

The width of the sheet metal bottom pieces is matched to the exterior distance between the oppositely oriented support flanges of the two cover elements which cover the lower depth struts.

In accordance with one embodiment the cover elements can be connected with the rack because in the area of their corners facing the corner connectors, the cover elements are chamfered and the outer lateral legs are correspondingly shortened. The cover elements together with set back contact surfaces of the corner connectors are connected flush with the lateral walls and the exterior surfaces of the corner connectors.

If the sheet metal bottom pieces rest against vertical profiled sides of the front and rear frame legs of the rack, the entire opening is closed.

A tight closure of the opening is achieved with first sealing elements arranged between the sheet metal bottom pieces and the support flanges of the inner lateral legs of the cover elements. The edges of the sheet metal bottom pieces facing the profiled sides of the front and rear frame legs of the rack have sealing elements.

If several sheet metal bottom pieces are used, the partition gaps between adjoining sheet metal bottom pieces are sealed by second sealing elements.

BRIEF DESCRIPTION OF THE DRAWINGS

This invention will be described in detail by means of an exemplary embodiment represented in the drawings, wherein.

DESCRIPTION OF PREFERRED EMBODIMENTS

Figure 1:
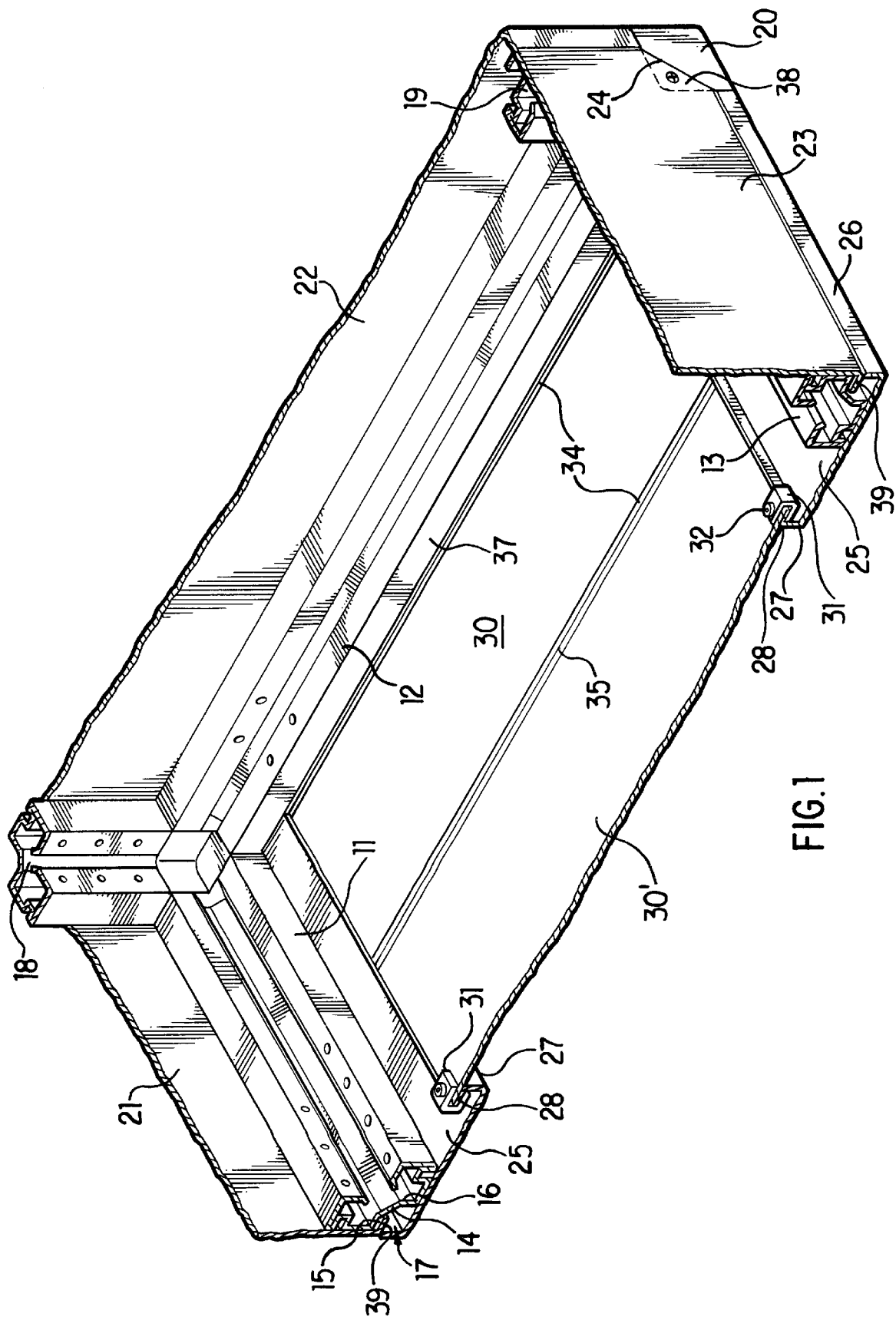
FIG. 1 is a sectional partial perspective view of a switchgear cabinet frame, according to one preferred embodiment of this invention.
Figure 2:
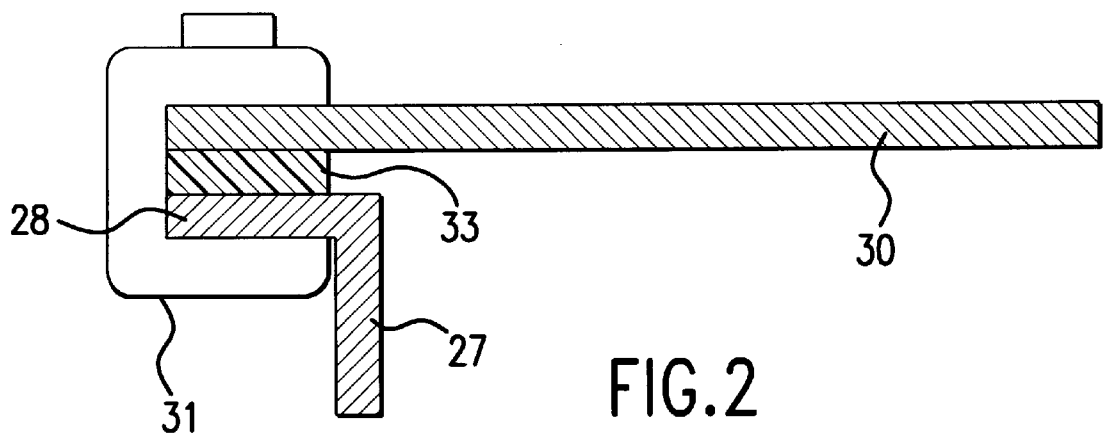
FIG. 2 is an enlarged cross-sectional side view of a portion of the switchgear cabinet frame shown in FIG. 1.
Figure 3A:
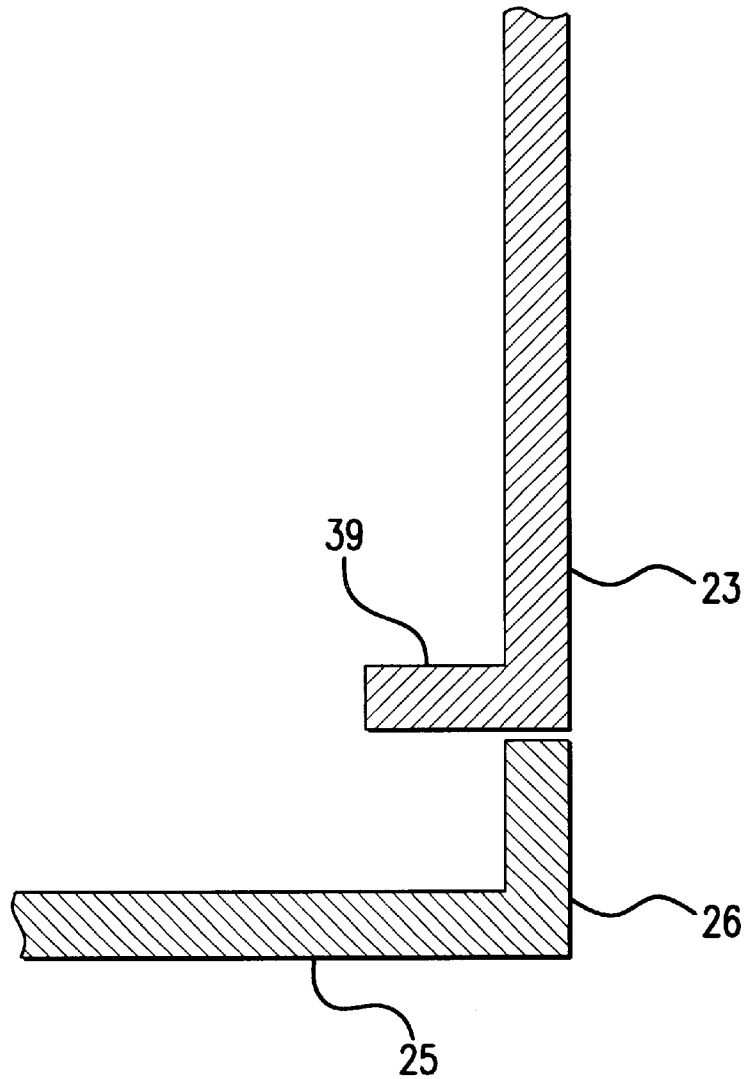
FIG. 3a is an enlarged cross-sectional view of a portion of a lateral wall with an edge and a U-shaped cover element with an outer lateral leg.
Figure 3B:
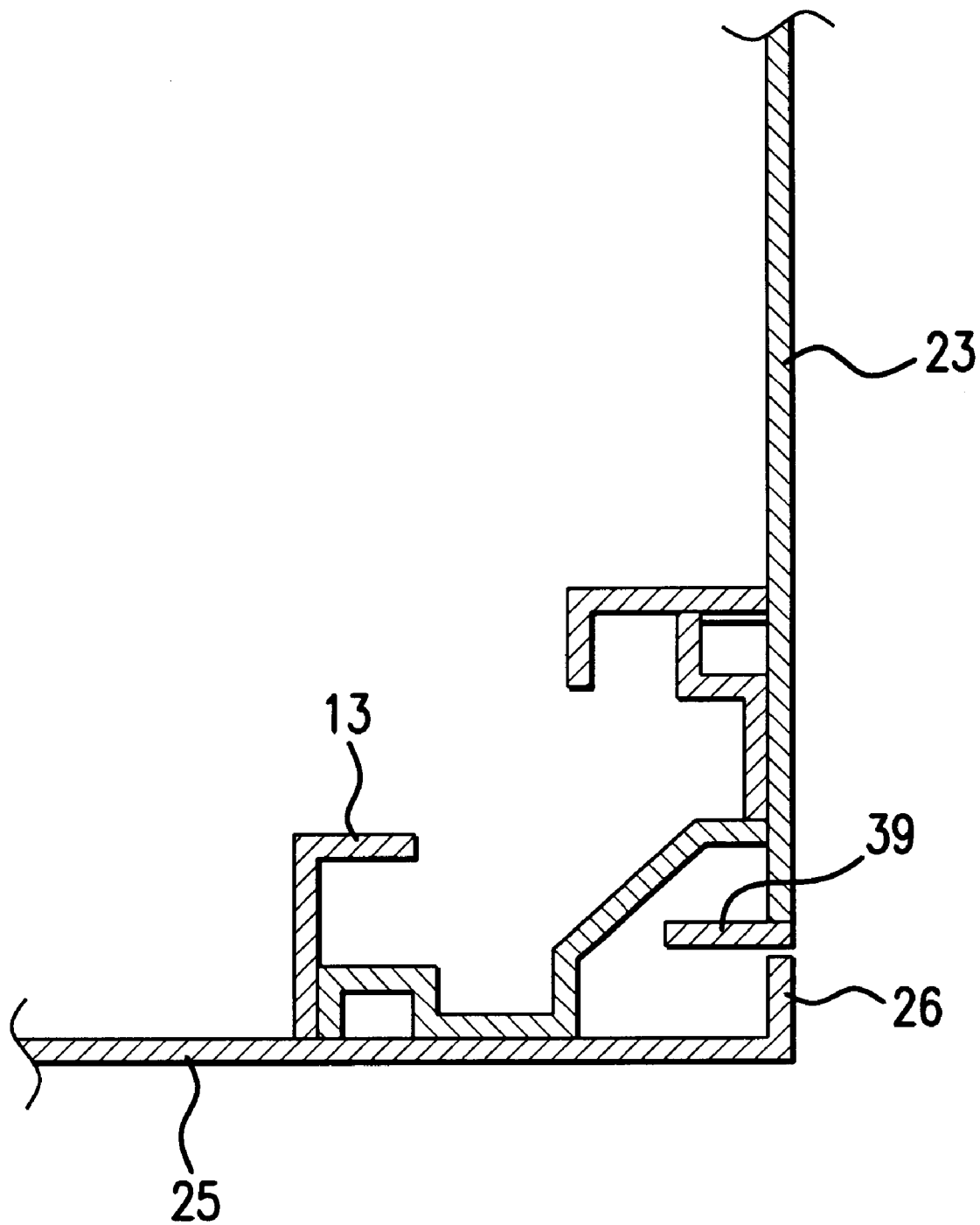
FIG. 3b is an enlarged cross-sectional view of a portion of a lateral wall and a U-shaped cover element inserted into an outer receiver.

In this case only the rear lower area of a switchgear cabinet is shown in FIGS. 1–3b, with the details required for fastening sheet metal bottom pieces. The frame legs of the rack of the switchgear cabinet which are used as depth struts 11 and 13, the rear lower frame leg 12 and the rear vertical frame legs 18 and 19 are only partially shown in FIG. 1. The depth strut 13 is connected by means of a corner connector 20 with the frame legs 12 and 19, and the depth strut 1 is connected by means of a corner connector 20 with the frame legs 12 and 18.

None of the frame legs 12, 18 and 19 nor the depth struts 11 and 13 have outer edges but rather are beveled in this area and, together with the profiled sides 14, 15 and 16 they form an outer receiver 17, into which the edges 39 of the lateral walls 21 and 23 as well as of the rear wall 22 are inserted, such that the cuboid exterior shape of the switchgear cabinet is completed. The door of the switchgear cabinet is also integrated into the switchgear cabinet in the same way, when it assumes its closed position.

In the bottom area the depth struts 11 and 13 are covered from below by means of generally U-shaped cover elements 25. In the area of their outer corners outer corners 24 of the wall elements 21, 22 and as shown in FIG. 1, the length of outer lateral legs 26 are appropriately shortened. The lateral wall 23, has an area 24 which rests against a contact surface 38 of the corner connector 20, which is set back by the width of its wall and is screwed together with the lateral wall 23. In this position the outside of the outer lateral leg 26 of the cover element 25 terminates flush with the exterior of the lateral wall 23 and the outer surface of the corner connector 20. The depth strut 11 is covered in the same way with a cover element 25.

The inner lateral legs 27, which face each other, of the two cover elements 25 are connected with the corner connector 20 associated with the depth strut 11 and 13. The inner lateral legs 27 comprise support flanges 28, which face a direction toward the corresponding depth struts 11 or 13. The width of the sheet metal bottom pieces 30, 30' correspond to the outer spacing of the oppositely oriented support flanges 28, so that the sheet metal bottom pieces 30, 30' can be connected with the support flanges 28 by means of clamp elements 31. The clamp elements 31 pass around the free exterior of the sheet metal bottom pieces 30, 30' and the underside of the support flanges 28. The sheet metal bottom pieces 30, 30' and the support flanges 28 are pressed together by means of an attachment screw 32 which can be displaced in the clamp element 31. In this case it is possible for first sealing elements 33 to be positioned between the sheet metal bottom pieces 30, 30' and the support flanges 28, which can also provide RF shielding.

The sheet metal bottom piece 30 rests against a vertical profiled side 37 of the rear lower frame leg 12. This partition gap can also be sealed by means of a sealing element, wherein a U-shaped second sealing element 34, for example, is placed on the edge of the sheet metal bottom piece 30. A partition gap 35 between two adjoining sheet metal bottom pieces 30, 30' can be sealed in a similar manner. The same applies to the sealing toward the front lower frame leg, not shown in FIGS. 1–3b.

I claim:

1. In a switchgear cabinet having a rack assembled with frame legs and corner connectors, and an open bottom which is closed by at least one sheet metal bottom piece, the improvement comprising:

the frame legs comprising a plurality of lower depth struts (11, 13) covered by a plurality of cover elements (25), each of the cover elements (25) comprising a U-shaped structure defined by an inner lateral leg (27) and an outer lateral leg (26), the cover elements (25) connected with at least one of the depth struts (11, 13) and the corner connectors (20), the depth struts (11, 13) beveled at outer edges and forming a receiver (17) for the outer lateral legs (26) of the cover elements (25), the inner lateral legs (27) of the cover elements (25) having a plurality of support flanges (28) for the sheet metal bottom piece (30), wherein the support flanges (28) face a direction toward the corresponding depth struts (11, 13), and the sheet metal bottom piece (30) connected with the support flanges (28) of the inner lateral legs (27) of the cover elements (25) by a plurality of U-shaped clamp elements (31) with a plurality of attachment screws (32).

2. In the switchgear cabinet in accordance with claim 1, wherein a width of the sheet metal bottom piece (30) is matched to an exterior distance between the oppositely oriented support flanges (28) of the cover elements (25) which cover the lower depth struts (11, 13).

3. In the switchgear cabinet in accordance with claim 2, wherein where the cover elements (25) meet the corner connectors (20), the outer lateral legs (26) are correspondingly shortened, and lateral wall (21, 23) are connected to a contact surface (38) of the corner connectors (20), the contact surface (38) of each corner connector (20) is set back from an outer surface of the corner connector (20), an outside of the outer lateral leg (26) of each element (25) is flush with an exterior of the corresponding lateral wall (23) and the outer surface of the corresponding connector corner (20).

4. In the switchgear cabinet in accordance with claim 3, wherein the sheet metal bottom piece (30) rests against a vertical profiled side of one frame leg (12) of the frame legs of the rack.

5. In the switchgear cabinet in accordance with claim 4, wherein a plurality of first sealing elements (33) are positioned between the sheet metal bottom piece (30) and the support flanges (28) of the inner lateral legs (27) of the cover elements (25).

6. In the switchgear cabinet in accordance with claim 4, wherein an edge of the sheet metal bottom piece (30) facing the profiled side of the one frame leg (12) of the frame legs of the rack has a second sealing element (34).

7. In the switchgear cabinet in accordance with claim 6, wherein a partition gap (35) between the sheet metal bottom piece (30) and an adjoining sheet metal bottom piece (30') is sealed by another second sealing element (34).

8. In the switchgear cabinet in accordance with claim 1, wherein where the cover elements (25) meet the corner connectors (20), the outer lateral legs (26) are correspondingly shortened, and lateral walls (21, 23) are connected to a contact surface (38) of the corner connectors (20), the contact surface (38) of each corner connector (20) is set back from an outer surface of the corner connector (20), an outside of the outer lateral leg (26) of each cover element (25) is flush with an exterior of the corresponding lateral wall (23) and the outer surface of the corresponding corner connector (20).

9. In the switchgear cabinet in accordance with claim 1, wherein the sheet metal bottom piece (30) rests against a vertical profiled side of one frame leg (12) of the frame legs of the rack.

10. In the switchgear cabinet in accordance with claim 1, wherein a plurality of first sealing elements (33) are positioned between the sheet metal bottom piece (30) and the support flanges (28) of the inner lateral legs (27) of the cover elements (25).

11. In the switchgear cabinet in accordance with claim 10, wherein the sheet metal bottom piece (30) rests against a vertical profiled side of one frame leg (12) of the frame legs of the rack, and an edge of the sheet metal bottom piece (30) facing the vertical profiled side of the one frame leg (12) of the frame legs of the rack has a second sealing element (34).

12. In the switchgear cabinet in accordance with claim 1, wherein a partition gap (35) between the sheet metal bottom piece (30) and an adjoining sheet metal bottom piece (30') is sealed by a second sealing element (34).

\* \* \* \* \*